United States Patent [19]

Joseph

[11] 4,293,344
[45] Oct. 6, 1981

[54] SETTING RETARDATIVES FOR COMPOSITIONS WITH A GYPSUM PLASTER BASE OR ANHYDRITE

[75] Inventor: Christian M. Joseph, Auzouer, France

[73] Assignee: Manufacture de Produits Chimiques Protex, Paris, France

[21] Appl. No.: 92,055

[22] Filed: Nov. 6, 1979

[51] Int. Cl.³ .................... C04B 13/00; C04B 43/00; E04C 2/00
[52] U.S. Cl. .................................. 106/111; 106/116; 106/315
[58] Field of Search ............... 106/109, 110, 111, 116, 106/314, 315

[56] References Cited

U.S. PATENT DOCUMENTS

| | | | |
|---|---|---|---|
| 2,868,752 | 1/1959 | Frazier | 106/111 |
| 3,121,702 | 2/1964 | Sherr et al. | 106/111 |
| 3,256,223 | 6/1966 | Heijmer | 106/110 |
| 4,157,264 | 6/1979 | Kennedy-Skipton | 106/111 |

FOREIGN PATENT DOCUMENTS

| | | | |
|---|---|---|---|
| 2409116 | 10/1974 | Fed. Rep. of Germany | 106/110 |
| 2325738 | 12/1974 | Fed. Rep. of Germany | 106/111 |
| 2125733 | 9/1972 | France | 106/111 |
| 2364869 | 4/1978 | France | |
| 1390360 | 4/1975 | United Kingdom | 106/116 |

OTHER PUBLICATIONS

Transactions British Ceramic Society, vol. 69, Mar. 70 #2.
Sheer, A. E., Plaster Compositions Industrial, Eng. Chem. Prod. R & D, vol. 8, No. 2, 1969, p. 193.

*Primary Examiner*—Gary P. Straub
*Attorney, Agent, or Firm*—Karl F. Ross

[57] ABSTRACT

A plaster composition is disclosed having a long setting time, which composition comprises a gypsum-based plaster and an effective amount of a setting retarding agent comprising a polymer having a molecular weight of less than 1000 of the formula:

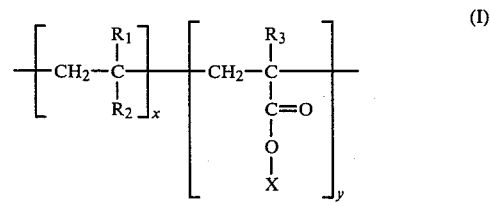

wherein
$R_1$ is hydrogen or methyl,
$R_2$ is COOH, COOR$_4$, wherein $R_4$ is $C_1$ to $C_4$ alkyl, CONH$_2$ or CN,
$R_3$ is hydrogen or methyl,
X is a sodium, potassium, lithium, calcium, magnesium, or ammonium ion, and
x and y designate the molar ratio of the two monomers forming the setting retarding agent of the formula I.

9 Claims, No Drawings

SETTING RETARDATIVES FOR COMPOSITIONS WITH A GYPSUM PLASTER BASE OR ANHYDRITE

The present invention concerns the setting retardants for the composition of the base of gypsum plaster or "anhydrite" utilized in the preparation of plaster coating and for other preparations with a gypsum base in the housing, construction materials and sculpture industries.

The plaster, a cheap product, is easy to make with readily available supplies, and, thanks to its specific characteristics:

it is fireproof, it is a regulator of the hydrometric degree: it absorbs or restores water vapor, it is a thermic insulator: its conductivity coefficient is equal to 0.4 Kcal/m.h.°C., it is a sound insulator, constituting a binding and construction material of quality, but in use, presents a certain number of serious inconveniences, of which the most troublesome is the setting speed which is too rapid.

In effect, the plasters have a tendency to harden, meaning that they set too rapidly after mixing with water. The hardening mechanism consists of a hydration of the largest part of the calcium sulfate half-hydrated ($\frac{1}{2}$ $H_2O$) into dihydrate (2 $H_2O$) in an aqueous suspension, which leads to the formation of a coherent mass through "entanglement" of the crystals of the dihydrate. Furthermore, the rapidity of setting is accordingly greater when the quantity of water approaches the quantity necessary for the hydration only, and the mixture is finer. This quantity of water makes up 25% of the weight of the plaster. Also, in practice, the plaster is wet with a very large excess of water in order to avoid a brutal kind of setting and to permit its use. Notwithstanding this procedure, however, one can only prepare and apply small quantities of plaster in a brief interval of time. Also as a troublesome consequence of that large excess of water, the workable material obtained which once is dry, is very porous and has very little mechanical resistance.

Hence, the building, construction materials and sculpture industries which employ on a grand scale the compositions of gypsum plaster or anhydrite, in the form of calcinated plaster, by itself or in mixtures of lime, sand and light aggregates like perlite and cellulose derivatives, desire means for lengthening the setting time of their compositions.

There are already numerous methods for lengthening the setting time, but none gave a completely satisfying result because of secondary effects that were strongly troublesome. It was proposed, for example, to utilize for this purpose tartaric acid, but the effect obtained this way is not very significant. It was likewise proposed to add the hydrolyzing proteins of animal or vegetable origin. But those hydrolyzing proteins are of complex mixtures, whose composition depends in part on the raw material utilized (whose quality is not regular) and then again on the hydrolysis processes which generally are very badly controlled and which bring to a retardant effectiveness which is not constant, and which can vary considerably from one operation to another. Furthermore, the retardants of this type have generally very strong characteristic odors, a poor stability in storage; they contribute to the formation of foam during the operations for preparing and use of the workable material, and very often facilitate mildew as well as undesirable discolorations in the composition of the plaster base. Furthermore, the setting retardants like phosphoric or citric acid, hexametaphosphate of soda or magnesia, will require a quantity of water for wetting, which is greater than the plaster for an identical consistency (constant fluidity), and will cause subsequently the modification of the final properties of the plaster treated this way, like appearance of efflorescence, blisters, lack of adherence and even the destruction of the coatings. It was already proposed to add to the compositions of plaster base certain acrylic polymners. But, in all the cases it concerns the polymers of high molecular weights which when stirred, will act as retardants of water absorption (U.S. Pat. No. 3,121,702), or which require, in order to exercise an effective and controllable action of the inhibition of setting, adding an agent which promotes neutralization of inhibiting effects, (French Pat. No. 2,364,869).

It was discovered that by adding certain acrylic polymers of low molecular weight to the wetting water of the plaster or other preparations of a plaster base to which other workable materials were added (lime, for example) or, granular substances (sand, stone dust, perlite, cellulose derivatives . . . ) permit notably longer setting times.

The term "plaster" should be understood as one which includes all the products obtained through dehydration and pulverization which are more or less, outgrowths of the natural or artificial raw materials (gypsum or anhydrite) containing essentially hydrated sulfate of lime.

Thus, the present invention is directed to setting retardants for the composition of a plaster base of gypsum or anhydrite of the acrylic hydrosoluble polymer or copolymer type with a low molecular weight of the formula:

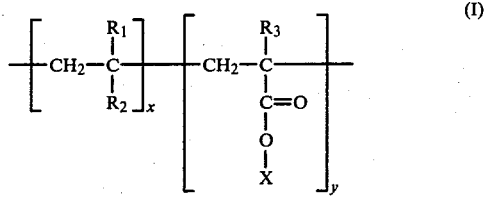

in which x and y designate the molar ratio of the monomers and obtained through polymerization of:

(a) 0 to 40 mols per 100 mols total, of one or several monomers of the formula:

in which:

$R_1$ is a hydrogen atom or a methyl radical—$CH_3$
$R_2$ is:

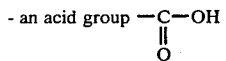

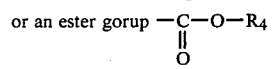

in which R₄ is an alkyl radical containing from 1 to 4 carbon atoms,

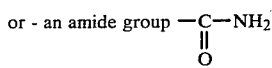

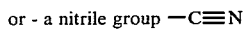

(b) 60 to 100 mols per 100 mols total, of a monomer with a formula:

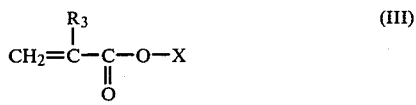

in which:

R₃ is a hydrogen atom or a methyl radical—CH₃

X is an atom of sodium, of potassium, of lithium, of calcium, of magnesium, or an ammonium group—NH₄.

The main characteristic of the polymers according to the invention is that their molecular weights, determined by measurements of intrinsic viscosity in an aqueous milieu, is less than 1000.

As examples of compounds of Formula II, one could especially cite: acrylic acid, methacrylic acid, methyl acrylate, ethyl acrylate, propyl acrylate, butyl acrylate, methyl methacrylate, ethyl methacrylate, propyl methacrylate, butylmethacrylate, acrylamide, methacrylamide, acrylonitrile, methacrylonitrile.

As examples of compounds of Formula III, one could especially cite: the sodium salt of acrylic acid, potassium salt of acrylic acid, lithium salt of acrylic acid, calcium salt of acrylic acid, magnesium salt of acrylic acid, ammonium salt of acrylic acid, sodium salt of methacrylic acid, potassium salt of methacrylic acid, lithium salt of methacrylic acid, calcium salt of methacrylic acid, magnesium salt of methacrylic acid, ammonium salt of methacrylic acid.

The hydrosoluble acrylic polymers or copolymers of a low molecular weight of the Formula (I) described previously, can be prepared with a well known technique in different ways, such as radical polymerization in an emulsion or in a solution with classic chain limiters to regulate the molecular weight.

The setting retardants according to the invention could be used in the form of a powder when obtained in that form, or more generally under the form of an aqueous solution which could reach 60–70% according to the nature and the percentage of the components (II) and (III).

The addition to plaster or to the composition of the plaster base can be made in a range of 0.001 to 2 p.p.c. (part percent) with preference to 0.005 to 0.5 p.p.c. dry in relation to plaster. It depends also on the kind of delay which is desired in each particular case.

The setting retardants, according to the invention could be:

premixed in the dry plaster when they are conditioned in powder form;

or, introduced very easily in the wetting water when it is in a liquid form, being in the state or form of a diluted solution when the dosage is too difficult to accomplish in the concentration of the source.

Those setting retardants can be used in plaster, by themselves, or, in association with other auxiliary agents (dispersing agents, foaming agents, water reducing agents, waterproofing agents, fungicides, and coloring matters) or, with other workable materials (lime, for example) or finally, with mineral or organic aggregates (sand, stone dust, perlite, cellulose derivatives . . . ), with the aim of realization of either concrete or mortar, or different coatings.

Moreover, the present invention will be better understood with the aid of the following examples which describe in a non-limited manner, the amelioration concerning the lengthening of the setting time, obtained with the aid of retardants according to the invention.

In those examples, the parts percent are in weights, except when otherwise indicated. All the tests were carried out with fine construction plaster named symbolically "PFC 2" according to the french standard NF/B 12 301.

EXAMPLE 1

The measurements of the duration of the outset are carried out on mixtures of water and plaster containing increasing doses of acrylic polymers conforming to the invention and the acrylic polymers non-conforming to the invention, that is to say, whose molecular weights are higher than 1000, according to an adapted method from the French standard NF/B 12 401 paragraph 2-321: outset of setting.

Principle: One determines the quantity of water in relation to the added plaster or to the non-adjuvant, in order that a defined volume of mixture gives a determined spread, and upon the mixture thus obtained, the setting outset is determined.

Modus operandi: 120 g. of distilled water at 20°±1° C. is weighed in a beaker, 200 g. of plaster "PFC2" is weighed in another one. The plaster is poured while stirring for at least 30 seconds into the water. The stirring is continued for a total duration of 1 minute and 30 seconds. The obtained paste is poured in a non-oxidizable steel cylinder of an inner diameter of 50 mm. and of 50 mm. height placed on a glass plate. The surface of the paste is made flush with the upper edge of the cylinder. After 15 seconds of waiting, the cylinder is brusquely raised: The paste spreads out. One looks to obtain a flat cake whose perpendicular diameters are comprised of between 15 and 16 cm. If such is not the case, however, the quantity of water is modified in a suitable sense. The outset of setting is thus determined in a conditioned chamber (20±1° C., 65% RH) upon the flat cake of paste of a suitable consistence (15 cm<φ<16 cm). For that, at a regular interval, a knife blade (kept in a vertical position) is passed lightly and it is considered that there is an outset of setting when the edges of the slit do not reclose. The duration of the outset of setting is counted from the time the plaster is brought into contact with the water.

Acrylic polymers tested:

acrylic polymer A: polyacrylate of soda of a molecular weight 500–600 (according to the invention);

acrylic polymer B: polyacrylate of soda of a molecular weight 1000–1200;

acrylic polymer C: polyacrylic acid partially neutralized with soda (70% neutralized acid group) of the molecular weight 500–600 (according to the invention);

acrylic polymer D: polyacrylic acid partially neutralized with soda (70% neutralized acid group) of the molecular weight 1000–2000.

The results are presented in Table I.

Those results show that the acrylic polymer of a weight less than 1000, according to the invention extends considerably the setting time of plaster, in relation to plaster without an additive or containing acrylic polymers with a molecular weight higher than 1000.

TABLE I

| ADDITIVE duration of outset of setting | Dose p.p.c. on dry plaster | Acrylic polymer A according to the invention | Acrylic polymer B | Acrylic polymer C according to the invention | Acrylic polymer D |
| --- | --- | --- | --- | --- | --- |
| pure plaster | 0 | 26 minutes | 26 minutes | 26 minutes | 26 minutes |
| plaster with additive | 0.005 | 36 minutes | 27 minutes | 35 minutes | 26 minutes |
|  | 0.01 | 72 minutes | 28 minutes | 68 minutes | 27 minutes |
|  | 0.03 | 195 minutes | 28 minutes | 180 minutes | 27 minutes |
|  | 0.05 | 540 minutes | 29 minutes | 570 minutes | 28 minutes |
|  | 0.1 | 1020 minutes | 31 minutes | 1110 minutes | 29 minutes |

EXAMPLE 2

The measurements of the duration of the outset of setting are carried out upon mixtures of water and plaster without lime on one side, and on the other side, plaster with 5% lime, containing increasing doses of acrylic copolymers conforming to the invention, and acrylic copolymers non-conforming to the invention, according to the same principle and the same modus operandi as in Example 1.

Acrylic copolymers tested:

acrylic copolymer E: 35/65 polyacrylonitrile—polyacrylic acid partially neutralized with soda (60% neutralized acid group) of a molecular weight 600-700, according to the invention;

acrylic copolymer F: 35/65 polyacrylonitrile—polyacrylic acid partially neutralized with soda (60% neutralized acid group) of a molecular weight 1100-1200.

The results are presented in the Table II.

Those results show again that the acrylic copolymers of a molecular weight less than 1000, extend considerably the plaster's setting time, in relation to plasters without additive or plasters containing acrylic copolymers of a molecular weight above 1000.

TABLE II

| ADDITIVE | Dose p.p.c. of dry workable material | Duration of the outset of setting in minutes | |
| --- | --- | --- | --- |
| | | Plaster without lime | Plaster with 5% lime |
| control | 0 | 26 | 37 |
| acrylic copolymer E according to the invention | 0.01 | 42 | 40 |
| | 0.025 | 155 | 114 |
| | 0.05 | 270 | 207 |
| | 0.1 | 620 | 516 |
| acrylic copolymer F | 0.01 | 27 | 38 |
| | 0.025 | 28 | 39 |
| | 0.05 | 30 | 42 |
| | 0.1 | 31 | 44 |

EXAMPLE 3

The measurements of the duration of the outset of setting are carried out upon mixtures of water and plaster without lime on one side, and on plaster with 5% of lime on the other side which contains increasing doses of acrylic copolymers conforming to the invention and acrylic copolymers non-conforming to the invention, according to the same principle and the same modus operandi as in Example 1.

Acrylic copolymers tested:

acrylic copolymer G: 20/80 polyacrylamide- polyacrylic acid partially neutralized with soda (60% neutralized acid groups) of a molecular weight 700-800, according to the invention.

acrylic copolymer H: 20/80 polyacrylamide—polyacrylic acid partially neutralized with lime (60% neutralized acid groups) of a molecular weight 1200-1400.

The results are presented in Table III.

Those results show afresh that the acrylic copolymers of a molecular weight less than 1000 extend considerably the setting time of plasters in relation to plasters without additives of plasters containing acrylic copolymers of a molecular weight higher than 1000.

TABLE III

| ADDITIVE | Dose p.p.c. of dry workable material | Duration of the outset of setting in minutes | |
| --- | --- | --- | --- |
| | | Plaster without lime | Plaster with 5% lime |
| Control | 0 | 26 | 37 |
| acrylic copolymer G according to the invention | 0.01 | 47 | 42 |
| | 0.025 | 185 | 142 |
| | 0.05 | 402 | 321 |
| | 0.1 | 890 | 740 |
| acrylic copolymer H | 0.01 | 27 | 37 |
| | 0.025 | 27 | 38 |
| | 0.05 | 29 | 40 |
| | 0.1 | 31 | 43 |

EXAMPLE 4

The measurements of the duration of the outset of setting are carried out upon mixtures of water and plaster containing increasing doses of acrylic polymers conforming to the invention and acrylic polymers non-conforming to the invention, according to the same principle and the same modus operandi as in Example 1.

Acrylic polymers tested:

acrylic polymer I: potassium polymethacrylate of a molecular weight 600-700, according to the invention;

acrylic polymer J: potassium polymethacrylate of a molecular weight 1000-1200;

acrylic polymer K: polymethacrylic acid partially neutralized with potassium (70% neutralized acid group) of a molecular weight 600-700 according to the invention.

acrylic polymer L: polymethacrylic acid partially neutralized with potassium (70% neutralized acid groups) of a molecular weight 1000-1200.

The results are presented in Table IV.

The results show again that the acrylic polymers of a molecular weight less than 1000 extend considerably the plaster's setting time, in relation to plaster without additives or plasters containing acrylic copolymers of a molecular weight higher than 1000.

TABLE IV

| ADDITIVE Duration of setting outset (in minutes) | Dose p.p.c. of dry plaster | Acrylic polymer I according to the invention | Acrylic polymer J | Acrylic polymer K according to the invention | Acrylic polymer L |
| --- | --- | --- | --- | --- | --- |
| pure plaster | 0 | 26 minutes | 26 minutes | 26 minutes | 26 minutes |
| plaster with additive | 0.005 | 34 minutes | 26 minutes | 35 minutes | 26 minutes |
|  | 0.01 | 58 minutes | 27 minutes | 60 minutes | 27 minutes |
|  | 0.03 | 115 minutes | 28 minutes | 125 minutes | 28 minutes |
|  | 0.05 | 240 minutes | 29 minutes | 285 minutes | 29 minutes |
|  | 0.1 | 580 minutes | 32 minutes | 615 minutes | 31 minutes |

Of course, various modifications may be contributed by the men of arts to the arrangement or process which were described solely by the right of the non-restrictive examples without going beyond the framework of the invention.

I claim:

1. A plaster composition having a long setting time which comprises a gypsum-based plaster and 0.001–2 percent of a polymer having a molecular weight of less than 1000 of the formula I, as a setting retarding agent:

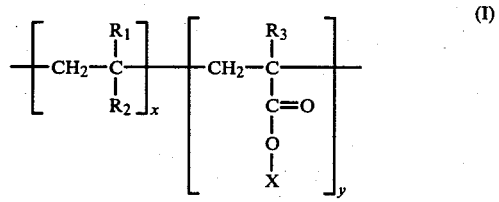

wherein
$R_1$ is hydrogen or methyl,
$R_2$ is —COOH, COOR$_4$ wherein $R_4$ is $C_1$ to $C_4$ alkyl, —CONH$_2$, or —CN,
$R_3$ is hydrogen or methyl,
X is a sodium, potassium, lithium, calcium, magnesium, or ammonium ion, and
x and y designate the molar ratio of the two monomers forming the setting retarding agent of the formula I, so that x indicates that 0 to 40 moles of the monomer of the formula II $$CH_2=\overset{R_1}{\underset{}{C}}-R_2$$

are present per 100 moles of the setting retarding agent of the formula I and so that y indicates that 60 to 100 moles of the monomer of the formula III $$CH_2=\overset{R_3}{\underset{\underset{O}{\|}}{C}}-C-O-X$$

are present per 100 moles of the setting retarding agent of the formula I.

2. The plaster composition defined in claim 1 wherein the polymer of the formula I has a molecular weight of 500 to 800.

3. The plaster composition defined in claim 1 wherein the monomer of the formula II is selected from the group consisting of acrylic acid, methacrylic acid, methyl acrylate, ethyl acrylate, propyl acrylate, butyl acrylate, methyl methacrylate, ethyl methacrylate, propyl methacrylate, butyl methacrylate, acrylamide, methacrylamide, acrylonitrile, and methacrylonitrile.

4. The plaster composition defined in claim 1 wherein the monomer of the formula III is selected from the group consisting of the sodium salt of acrylic acid, potassium salt of acrylic acid, lithium salt of acrylic acid, calcium salt of acrylic acid, sodium salt of methcrylic acid, potassium salt of the methacrylic acid, lithium salt of methacrylic acid, calcium salt of methacrylic acid, magnesium salt of methacrylic acid, ammonium salt of methacrylic acid, magnesium salt of acrylic acid and ammonium salt of acrylic acid.

5. The plaster composition defined in claim 1 wherein the polymer of formula I includes $R_2$ as —COOH or —COOR$_4$ wherein $R_4$ is $C_1$ to $C_4$ alkyl.

6. The plaster composition defined in claim 1 wherein the polymer of formula I includes $R_2$ as —COOH.

7. The plaster composition defined in claim 1 which further comprises at least one auxiliary agent selected from the group consisting of dispersing agents, foaming agents, water reducing agents, water-proofing agents, fungicides and coloring agents.

8. The plaster composition defined in claim 1 wherein the setting retarding agent constitutes between 0.005 and 1 per cent of the amount of the gypsum-based plaster.

9. A process for increasing the setting time of gypsum-based plaster which comprises the step of adding to said gypsum-based plaster 0.001–2 percent of the setting retarding agent defined in claim 1.

* * * * *